(12) United States Patent
Freimann et al.

(10) Patent No.: US 7,342,667 B1
(45) Date of Patent: Mar. 11, 2008

(54) METHOD OF PROCESSING AN OPTICAL ELEMENT USING AN INTERFEROMETER HAVING AN ASPHERICAL LENS THAT TRANSFORMS A FIRST SPHERICAL BEAM TYPE INTO A SECOND SPHERICAL BEAM TYPE

(75) Inventors: Rolf Freimann, Aalen (DE); Bernd Dörband, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 348 days.

(21) Appl. No.: 10/721,232

(22) Filed: Nov. 26, 2003

(51) Int. Cl.
*G01B 11/02* (2006.01)

(52) U.S. Cl. .................................................. 356/515

(58) Field of Classification Search ........ 356/511–515, 356/489, 495
See application file for complete search history.

(56) References Cited

U.S. PATENT DOCUMENTS

| | | | |
|---|---|---|---|
| 4,340,306 A | | 7/1982 | Balasubramanian |
| 4,468,122 A | * | 8/1984 | Puryaev ........................ 356/513 |
| 4,697,927 A | * | 10/1987 | Ono ............................. 356/513 |
| 4,732,483 A | | 3/1988 | Biegen |
| 5,361,312 A | | 11/1994 | Kuchel |
| 5,416,586 A | * | 5/1995 | Tronolone et al. .......... 356/513 |
| 5,473,434 A | | 12/1995 | de Groot |
| 5,488,477 A | | 1/1996 | de Groot |
| 5,548,403 A | | 8/1996 | Sommargren |
| 5,777,741 A | | 7/1998 | Deck |
| 5,982,490 A | | 11/1999 | Ichikawa et al. |
| 6,312,373 B1 | * | 11/2001 | Ichihara ....................... 356/515 |
| 6,781,700 B2 | * | 8/2004 | Kuchel ......................... 356/513 |
| 2002/0063867 A1 | | 5/2002 | Otto |
| 2003/0002048 A1 | * | 1/2003 | Zanoni ......................... 356/512 |

OTHER PUBLICATIONS

Patrick P. Naulleau, et al., "Extreme-Ultraviolet Phase-Shifting Point-Diffraction Interferometer: A Wave-Front Metrology Tool with Subangstrom Reference-Wave Accuracy," Applied Optics, vol. 38, No. 35, Dec. 10, 1999, pp. 7252-7263, Optical Society of America.
Daniel Malacara, Ed., "Optical Shop Testing," Second Edition, 1992, Chapter 1.2, pp. 18-49, John Wiley & Sons, Inc., New York.
Daniel Malacara, Ed., "Optical Shop Testing," Second Edition, 1992, Chapter 2.1, pp. 51-53, John Wiley & Sons, Inc., New York.
Daniel Malacara, Ed., "Optical Shop Testing," Second Edition, 1992, Chapter 2.6, pp. 73-77, John Wiley & Sons, Inc., New York.

* cited by examiner

*Primary Examiner*—Patrick Connolly
(74) *Attorney, Agent, or Firm*—Jones Day (57) ABSTRACT

A method of processing an optical element having a spherical surface comprises providing a first interferometer apparatus having an interferometer optics with an aspherical lens for transforming a beam of a first spherical beam type into a beam of a second spherical beam type, arranging the optical element in a beam path of an incident beam provided by the interferometer optics, interferometrically taking a first measurement of the optical element, and determining first deviations of the spherical surface. The method further comprises arranging the aspherical lens in a beam path of a measuring beam provided by a beam source of a second interferometer apparatus, wherein the measuring beam is one of the first spherical type and the second spherical type, interferometrically taking a second measurement using the measuring beam, and determining second deviations of an aspherical surface of the aspherical lens.

24 Claims, 5 Drawing Sheets

METHOD OF PROCESSING AN OPTICAL ELEMENT USING AN INTERFEROMETER HAVING AN ASPHERICAL LENS THAT TRANSFORMS A FIRST SPHERICAL BEAM TYPE INTO A SECOND SPHERICAL BEAM TYPE

BACKGROUND OF THE INVENTION

1. Field of the Invention

The present invention relates to the field of measuring and manufacturing optical surfaces using an interferometer apparatus. In particular the invention relates to processing an optical element having a spherical surface.

2. Brief Description of Related Art

The optical element having the optical surface is, for example, an optical component such as an optical lens or an optical mirror used in optical systems, such as telescopes used in astronomy, or systems used for imaging structures of a mask ("reticle") onto a radiation sensitive substrate ("resist") in a lithographic method. The success of such an optical system is substantially determined by the precision with which the optical surface can be machined or manufactured to have a target shape. In such manufacture it is necessary to compare the shape of the machined optical surface with its target shape, and to determine differences between the machined and target surfaces. The optical surface is then further machined at those portions where differences between the machined and target surfaces exceed e.g. a predefined threshold.

Interferometric apparatuses are commonly used for high precision measurements of optical surfaces. Examples of such apparatus are disclosed in U.S. Pat. No. 4,732,483, U.S. Pat. No. 4,340,306, U.S. Pat. No. 5,473,434, U.S. Pat. No. 5,777,741, U.S. Pat. No. 5,488,477. The entire contents of these documents are incorporated herein by reference.

A conventional instrument and method for qualifying an optical element having a spherical optical surface will be illustrated with reference to FIG. 1 below. An interferometer apparatus 1 is of a Fizeau interferometer type having an optical axis 3 and a laser light source 5 such as a Helium-Neon-gas laser, emitting a laser beam 7. A microobjective 9 collimates laser beam 7 onto a pinhole of a spatial filter 11 such that a diverging beam 13 of coherent light having spherical wavefronts originates from the pinhole of spatial filter 11. An interferometer optics 15 having plural lenses 17,18,19,20,21 transforms diverging beam 13 into a converging beam 23 such that a crossover of converging beam 23 is formed in a region 25 on optical axis 3. Wavefronts in converging beam 23 are substantially spherical wavefronts.

Lens 21 is the focusing lens of the interferometer optics which is closest to crossover 25 of converging beam 23. A concave surface 27 of focussing lens 21 forms a Fizeau surface of Fizeau interferometer 1. Concave surface 35 has a substantially spherical shape with crossover 23 as its center. Surface 27 is partially reflective, and spherical wavefronts of converging beam 23 are partially reflected from surface 27 such that they travel back in the beam path of interferometer apparatus 1 and are transformed to substantially spherical converging wavefronts by interferometer optics 15. A partially transmissive mirror 29 is arranged in the beam path of beam 13 such that wavefronts reflected from Fizeau surface 27 are imaged by a camera lens 31 onto a light sensitive substrate of a camera 33.

The optical element 35 to be manufactured has a convex spherical surface 37 to be qualified. Element 35 is arranged in the beam path of converging measuring light beam 23 such that surface 37 faces interferometer optics 15 and such that a center of curvature of convex surface 37 substantially coincides with crossover 25. Spherical wavefronts of measuring light beam 23 are reflected from surface 37 and travel back through interferometer optics 15 and are imaged onto camera 33. On camera 33 the wavefronts reflected back from reference surface 27 and the wavefronts reflected back from surface 37 under test are superimposed and form interference fringes detected by camera 33. From a measurement of such interference fringes deviations of surface 37 from its target spherical shape may be determined. Based on such determination surface 37 may be machined for better conforming to its target shape.

An opening ratio k may be defined for surface 37 having a diameter D and a radius R as $$k = \frac{1}{2\sin\alpha},$$

wherein $\alpha$ is an opening angle and satisfies $D=2R\sin\alpha$. This opening ratio is often referred to as f-number F/#.

Figure 1:
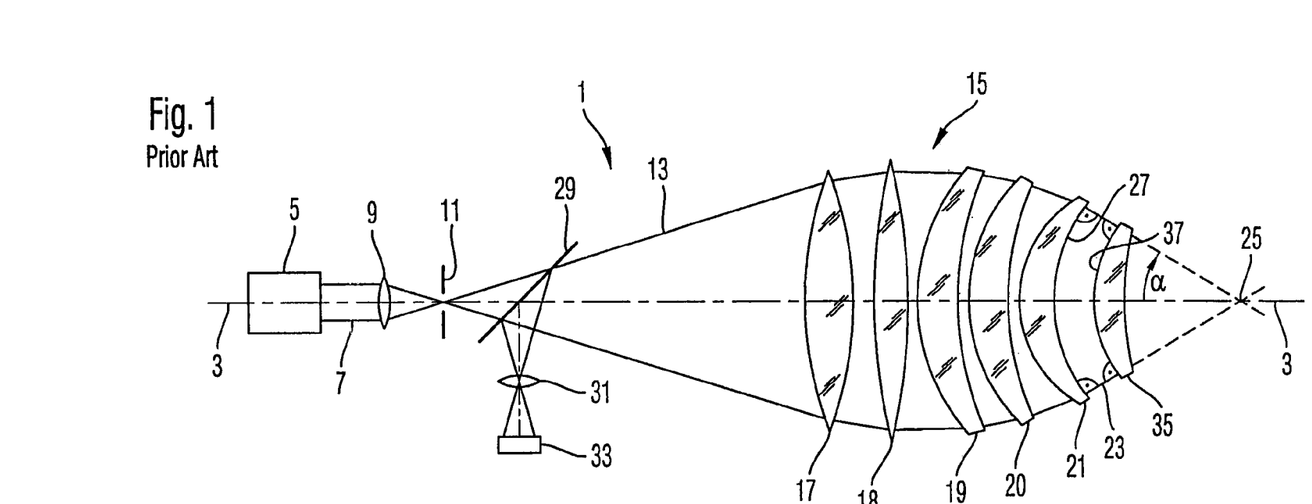
FIG. 1 illustrates an interferometric apparatus and method according to the prior art.

It appears from FIG. 1, that for small values of the opening ratio k diameters of lenses 17,18,19,20,21 of interferometer optics 15 have to be substantially higher than diameter D of spherical surface 37 under test. Further, the interferometer optics must comprise a considerable number of plural lenses having spherical surfaces for providing the beam 23 of measuring light having wavefronts which do not deviate from the spherical shape to an extent such that the measurement precision is reduced by such deviation. Manufacture of interferometer optics having plural lenses of a high diameter with the necessary precision is not only expensive but also demanding from its optical design.

SUMMARY OF THE INVENTION

The present invention has been accomplished taking the above problems into consideration.

Thus, it is an object of the present invention to provide an improved method for qualifying an optical surface.

It is also an object of the present invention to provide an improved method of manufacturing an optical surface.

It is a further object of the present invention to provide an interferometer apparatus and method suitable for qualifying convex optical surfaces with a small f-number F/#.

The forgoing objects are accomplished by providing a method of manufacturing and or qualifying an optical element having a spherical surface by using an interferometer apparatus having an interferometer optics comprising an aspherical lens having at least one aspherical surface. The aspherical lens is designed and configured such that it transforms a beam of a first spherical beam type into a beam of a second spherical beam type.

Within the scope of the present application the term "spherical beam type" includes beams having substantially spherical wavefronts or substantially flat wavefronts which are spherical in that sense that a radius of curvature thereof is infinite.

The above mentioned configuration of the aspherical lens is used for the reason that such type of aspherical lens may be easily manufactured and qualified with high precision by using an independent interferometric measurement.

An advantage of the invention may be understood as follows. The prior art apparatus described above comprises an interferometer optics made of plural spherical lenses.

Spherical lenses are chosen because only spherical surfaces may be easily manufactured and qualified with high precision. A spherical lens having a high optical power and a large diameter introduces considerable opening errors. The interferometer optics has to provide a high optical power for transforming the diverging beam of measuring light entering the interferometer optics into the strongly converging beam incident on the surface under test. For generating only limited opening errors while maintaining the total optical power the conventional interferometer optics comprises a considerable number of single spherical lenses each having a comparatively low optical power.

It was known in the art that aspherical lenses may be used for compensating optical errors introduced by spherical lenses. Using a lens having a generally aspherical surface in an interferometer optics would require, however, to qualify the aspherical surface with a necessary precision. Interferometric methods and apparatuses for measuring generally aspherical surfaces to the required high precision are either not available or too expensive.

The inventors found, however, that the particular type of aspherical lens transforming one spherical beam type into another spherical beam type may be advantageously used in an interferometer optics for measuring spherical surfaces of small opening ratio since this type of a spherical lens may be tested by an interferometric method involving a flat or a spherical reference surface and not involving a null test using a compensator which test is conventionally used for qualifying aspherical surfaces (see e.g. chapter 12 of Daniel Malacara, Optical Shop Testing, 2nd edition, Wiley interscience Publication (1992)).

Reference mirrors of a flat or spherical shape of high precision are available. Compensators for null tests for aspherical surfaces according to the conventional methods provide beams of measuring light having aspherical wavefronts. It is extremely demanding to qualify such compensators. Since the present invention uses the aspherical lens of the particular type which may be tested without using such type of compensators for the null test a considerable advantage is achieved since this aspherical lens may be easily qualified and manufactured to a high precision and may be advantageously used in the high precision interferometer optics having a considerably low number of optical lenses.

According to an exemplary embodiment the aspheric lens has a spherical surface and an aspherical surface such that only one aspherical surface has to be manufactured while the second surface of the lens is a spherical surface which is manufactured more easily as compared to the aspherical surface. According to an alternative exemplary embodiment both surfaces of the aspherical lens are aspheric surfaces. Such configuration may be advantageously chosen in situations where the manufacture of a lens having corresponding optical properties and only one aspherical surface involves particular high demands in manufacture of the single aspherical surface. Such situation occurs, for example, if deviations of such single aspherical surface from a spherical shape are particularly high.

According to an embodiment of the invention the method of manufacturing the optical surface further includes machining the optical surface after measuring the same, wherein the machining is performed in dependence of deviations of the measured optical surface from its target shape.

According to a preferred embodiment the method of manufacturing includes a final finishing of the machined optical surface.

The forgoing, and other features, and advantages of the invention will be more apparent from the following detailed description of exemplary embodiments of the invention with reference to the accompanying drawings.

BRIEF DESCRIPTION OF THE DRAWINGS

The forgoing as well as other advantageous features of the invention will be more apparent from the following detailed description of exemplary embodiments of the invention with reference to the accompanying drawings, wherein.

DETAILED DESCRIPTION OF EXEMPLARY EMBODIMENTS

In the exemplary embodiments described below, components that are like in function and structure are designated as far as possible by alike reference numerals. Therefore, to understand the features of the individual components of a specific embodiment, the descriptions of other embodiments should be referred to.

The exemplary embodiments of methods described below involve interferometrically taking measurements of wavefronts generated by reflecting an incident beam provided by an interferometer apparatus from surfaces to be measured. Plural conventional interferometric methods may be used for taking such measurements. Examples of such interferometric methods are disclosed in e.g. U.S. Pat. No. 5,361,312, U.S. Pat. No. 5,982,490 and US 2002/0063867A1. The entire contents of these patents and publications are incorporated herein by reference.

Figure 2:
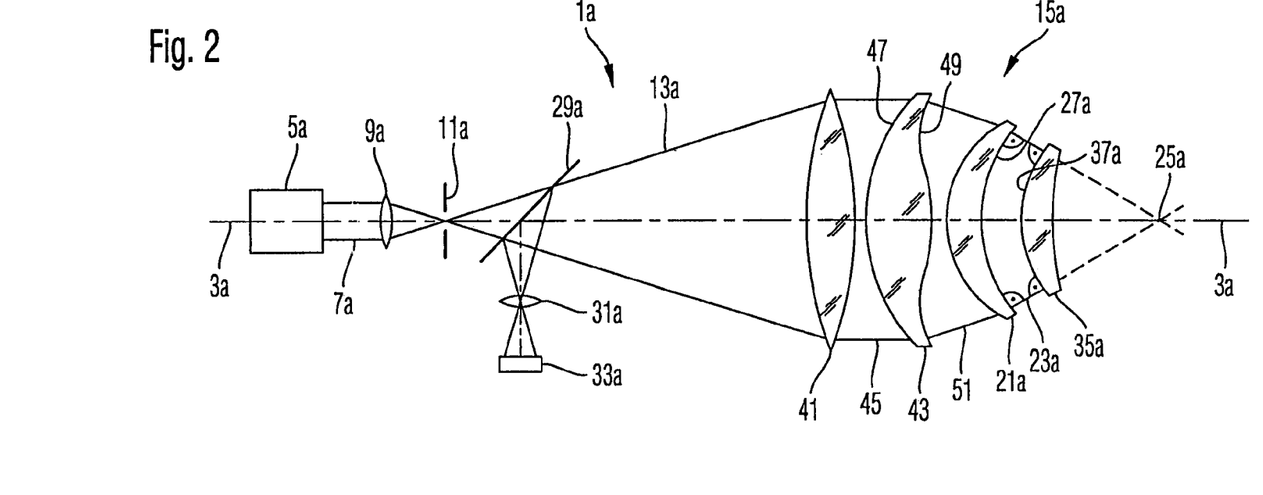
FIG. 2 is a sectional view of a production interferometer apparatus for testing a spherical surface of an optical element to be manufactured.

FIG. 2 illustrates a production interferometer apparatus $1a$ used in a method for qualifying and manufacturing an optical element $35a$ having a convex spherical surface $37a$ having a k-value of about 0.59 according to the present invention. The interferometer apparatus 1 is similar to that shown in FIG. 1, and features of FIG. 2 which are similar in arrangement and function to those features of FIG. 1 are given the same reference numerals supplemented with an additional character. In other examples the k-value of spherical surface $37a$ may have different values, such as about 0.55 to about 0.60, about 0.60 to about 0.70, or about 0.70 to about 0.80.

Interferometer apparatus 1a is of a Fizeau interferometer type having an optical axis 3a and a laser light source 5a such as a Helium-Neon-gas laser, emitting a laser beam 7a. A micro objective 9a collimates laser beam 7a onto a pinhole of a spatial filter 11a such that a diverging beam 13a of coherent light having spherical wavefronts originates from the pinhole of spatial filter 11a.

An interferometer optics 15a having plural lenses 41,43, 21a and transforming diverging beam 13a into a converging beam 23a such that a crossover of converging beam 23a is formed in a region 25a on optical axis 3a. Wavefronts in converging beam 23a are substantially spherical wavefronts. A concave surface 27a of lens 21a forms a Fizeau surface of interferometer apparatus 1a. Concave surface 27a has a substantially spherical shape with crossover 25a as its center.

The optical element 35a to be manufactured has a convex surface 37a to be qualified. A target shape of surface 37a is a spherical shape. Element 35a is arranged in the beam path of converging beam 23a such that a center of curvature of the target shape of surface 37a coincides with crossover 25a. Wavefronts reflected back from Fizeau surface 27a and wavefronts reflected back from surface 37a under test are superimposed on a light sensitive substrate of a camera 33a and form interference fringes thereon. Deviations of surface 37a from its target shape may be determined from interferometric measurements involving analysis of images of interference fringes detected by camera 33a.

Diverging beam 13a has a relatively small opening angle, and lens 41 transforms diverging beam 13a having spherical wavefronts into a parallel beam 45 having substantially flat wavefronts. Lens 41 has a comparatively low optical power and has two spherical surfaces which are sufficient to provide parallel beam 45 with wavefronts which are flat wavefronts with a sufficient precision. It is also possible to use two or more lenses for transforming diverging beam 13a into parallel beam 45 rather than the one spherical lens 41. Such lenses are known as collimators.

Lens 43 transforms parallel beam 45 having substantially flat wavefronts into a converging beam 51 having substantially spherical wavefronts. Lens 43 has a high optical power such that converging beam 51 has a large opening angle. It would not be possible to manufacture lens 43 having such high power with two spherical surfaces while maintaining the required precision of the spherical wavefronts in converging beam 23a incident on surface 37a under test. Therefore, lens 43 has only one spherical surface 47 while its other surface 49 is aspherical. Aspherical surface 49 is designed such that the wavefronts in converging beam 51 are substantially spherical wavefronts provided that the wavefronts in parallel beam 45 are substantially flat wavefronts.

Lens 21a transforms converging beam 51 to converging beam 23a incident on surface 37a under test. Lens 21a has a comparatively low optical power and two spherical surfaces. Spherical surface 27a is concentric with respect to crossover 25a, and the other spherical surface is designed such that lens 21a is aplanatic, i.e. has reduced coma for beams passing, lens 21a under a certain angle with respect to an optical axis thereof.

Compared to the conventional apparatus shown in FIG. 1, interferometer optics 15a has a reduced number of large diameter lenses. Due to the high optical power of aspherical lens 43 it was even possible to reduce the maximum diameter of the lenses to be used in the interferometer optics 15a according to the present invention.

To achieve the desired precision of measuring surface 37a under test it is then necessary to manufacture aspherical surface 49 of lens 43 with a corresponding high precision.

Figure 3:
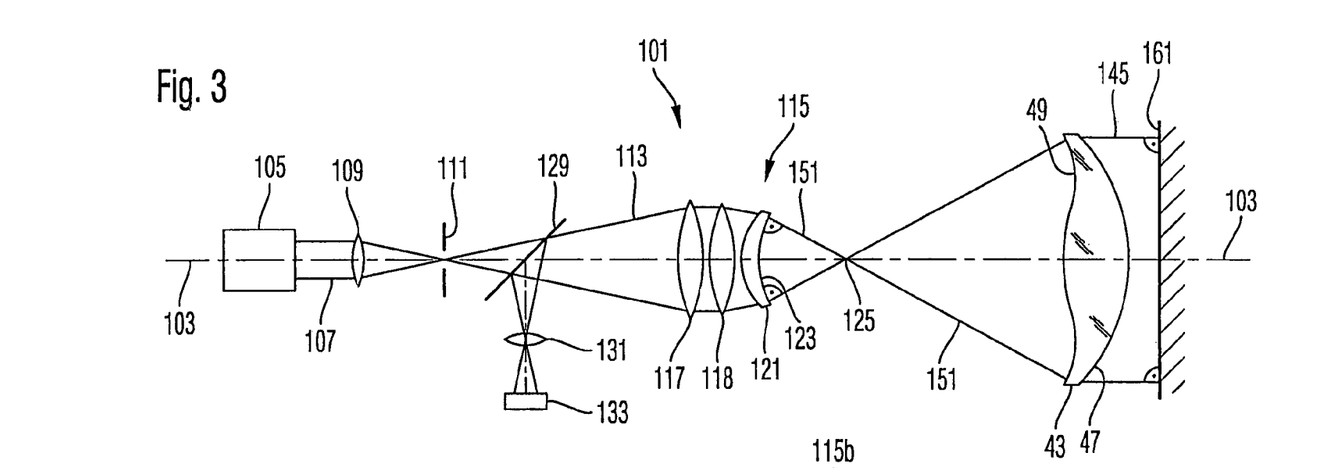
FIG. 3 is a sectional view of an auxiliary interferometer apparatus for testing an aspherical lens used in the production interferometer of FIG. 2.

FIG. 3 illustrates an auxiliary interferometer apparatus 101 for testing aspherical lens 43. Interferometer apparatus 101 is of a Fizeau type and comprises a laser light source 105 emitting a light beam 107 focused by lens 109 onto a pinhole of a spatial filter 111 for providing a diverging beam 113 which is transformed by an interferometer optics 115 having focusing lenses 117,118,121 into a converging beam 151 having substantially spherical wavefronts and forming a crossover 125 on an optical axis 103. Lens 121 of interferometer optics 115 closest to crossover 125 has a Fizeau surface 123 of the interferometer apparatus 101 which further comprises a semi-transparent mirror 129 disposed in diverging beam 113 and a camera 133 on which Fizeau surface 123 is imaged.

To the right of crossover 125 beam 151 is a diverging beam with an opening angle corresponding to the opening angle of beam 51 in FIG. 2. Diverging beam 151 passes through aspherical lens 43 under test and is transformed thereby into a parallel beam 145 having substantially flat wavefronts and corresponding to parallel beam 45 in FIG. 2. Parallel beam 145 is reflected by a flat reference mirror surface 161 orthogonal to optical axis 103. Thus, wavefronts reflected from mirror 161 travel back through aspherical lens 43 and interferometer optics 115 and interfere on detector 133 with wavefronts reflected back from Fizeau surface 123 of interferometer optics 115.

Mirror 161 is a reference mirror manufactured to be a flat mirror with a high precision. From an interferometric measurement and analysis of images detected by camera 133 it is possible to qualify aspherical lens 43 and, in particular, to determine deviations of its aspherical surface 49 from a target shape to fulfill the required function of aspherical lens 43, i.e. transforming diverging beam 151 having a same opening angle as beam 51 in FIG. 2 into parallel beam 145. If such determined deviations exceed a chosen threshold surface 49 will undergo additional machining to improve the function of aspherical lens 43 until a further measurement of lens 43 in the set up shown in FIG. 3 shows that aspherical lens 43 fulfills the required specification. Thereafter, aspherical lens 43 is mounted in interferometer optics 15 of FIG. 2, and optical element 35 having surface 37 of the spherical target shape is tested.

Figure 4:
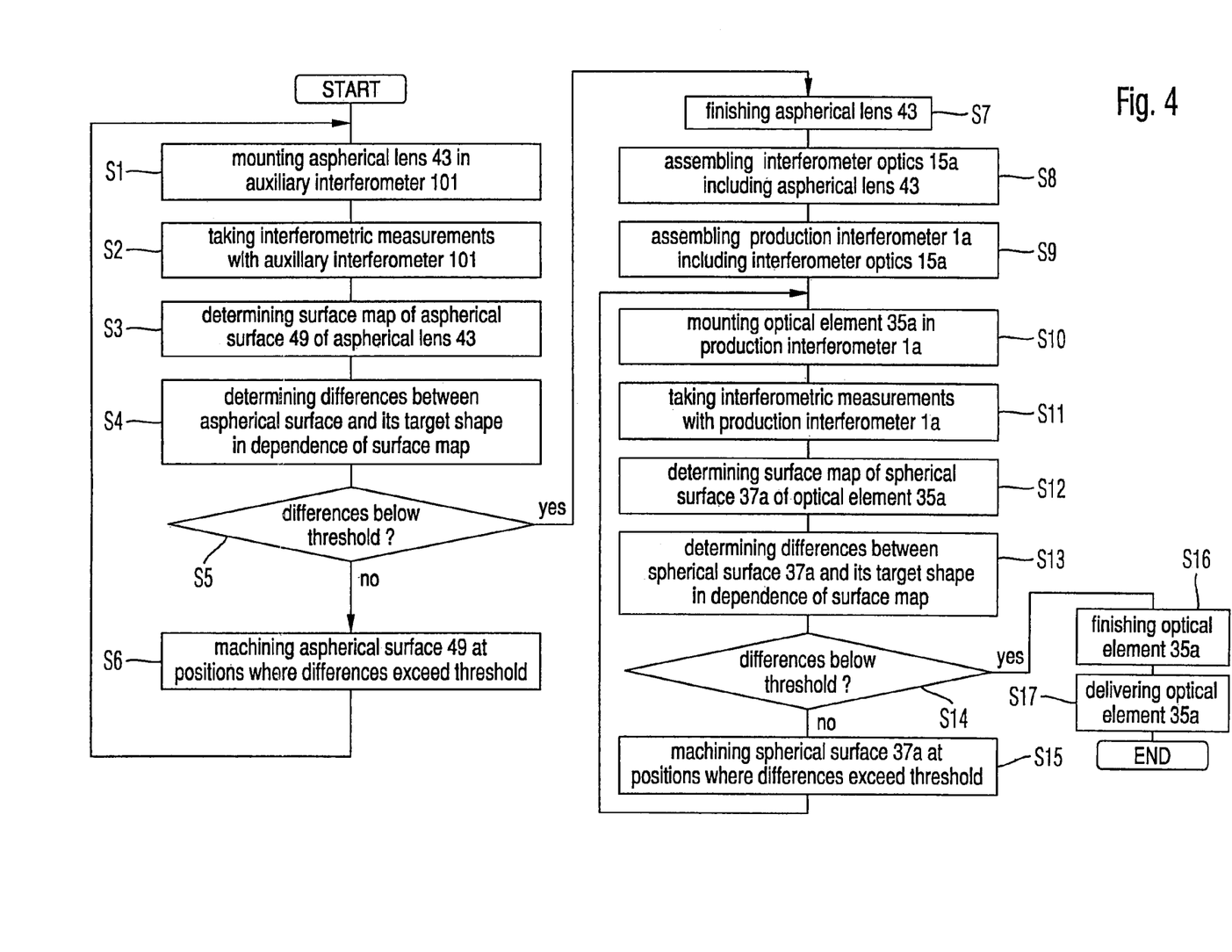
FIG. 4 is a flow chart of the method according to an embodiment of the present invention.

The method of processing optical element 35 is summarized with reference to the flow chart of FIG. 4 in the following:

At first, aspherical lens 43 of production interferometer optics 15a is manufactured and qualified by mounting the aspherical lens 43 in auxiliary interferometer 101 (step S1), taking interferometric measurements with auxiliary interferometer (S2) and determining a surface map of aspherical surface 49 of aspherical lens 42 (S3). Differences between the aspherical surface as measured and its target shape are calculated (S4), and it is determined whether these differences are below a predefined threshold (S5). If the differences are not below the threshold, the aspherical surface 39 is machined at those positions where the differences exceed the threshold (S6). It is also possible to machine the aspherical surface 49 at positions where the differences are below the threshold to further improve the desired result. Thereafter, the aspherical lens 43 is again mounted in the auxiliary interferometer 101 at step S1.

If the differences are below the threshold the aspherical lens is finished (S7) by providing antireflective coatings on its surfaces 49 and 47. Aspherical lens 43 now fulfils its design requirements and is mounted in the interferometer optics 15a (S8), and the production interferometer 1a is assembled (S9). Thereafter optical element, 35a to be manufactured is mounted in beam 23a of measuring light provided by interferometer optics 15a of production interferometer 1a as shown in FIG. 2 (S10). Interferometric measurements are taken with production interferometer 1a (S11), and a surface map of spherical surface 37a of optical element 35a is calculated (S12). Differences between the spherical surface 37a as tested and the target shape thereof are calculated (S13) and it is then determined whether these difference are below a further predefined threshold (S14). If the differences exceed the threshold, surface 37a of optical element 35a is machined to reduce these differences (S15).

Otherwise, a finishing step S16 is performed on the optical surface 37a. The finishing may include a final polishing of the surface or depositing a suitable coating, such as a reflective coating, an anti-reflective coating, and a protective coating.

A reflective coating may include, for example, a plurality of material layer pairs, for example 40 pairs of alternating molybdenum and silicon layers or other layers. Thicknesses of such layers may be about 5 nm and will be adapted to a wavelength to be reflected from the optical surface, such that a reflection coefficient is substantially high. Finally, the reflective coating may be covered by a cap layer for passivating the reflective coating. The cap layer may include a layer formed by depositing ruthenium, for example.

An anti-reflective coating which is intended to reduce reflections of radiation at an interface of an optical element, such as a lens element, may include magnesium flouride or lanthanum oxide or other conventional materials.

The above mentioned threshold value will differ from the application of the optical surface in an optical system for which it is designed. For example, if the optical surface is a lens surface in an objective for imaging a reticle structure onto a resist with radiation of a wavelength $\lambda$=193 nm, such threshold value may be in a region of about 2 nm to 10 nm, and if the optical surface will be used as a mirror surface in an imaging objective using EUV (extreme ultraviolet) radiation with a wavelength of e.g. $\lambda$=13.5 nm, the threshold value will be in a region of about 0.1 nm to 1.0 nm.

It is to be noted that it is not necessary that the above-mentioned threshold is a constant threshold over the whole area of the optical surface. It is possible that the threshold is dependent on e.g. a distance from a center of the surface or some other parameters.

The finished optical element 35a is then delivered and included in the optical system for which it is designed (S17). Thereafter a next optical element having a surface of the spherical target shape will be mounted in the production interferometer starting with step S10, and machining of the spherical surface will be performed according to steps S10 to S17 as illustrated above.

Figure 5:
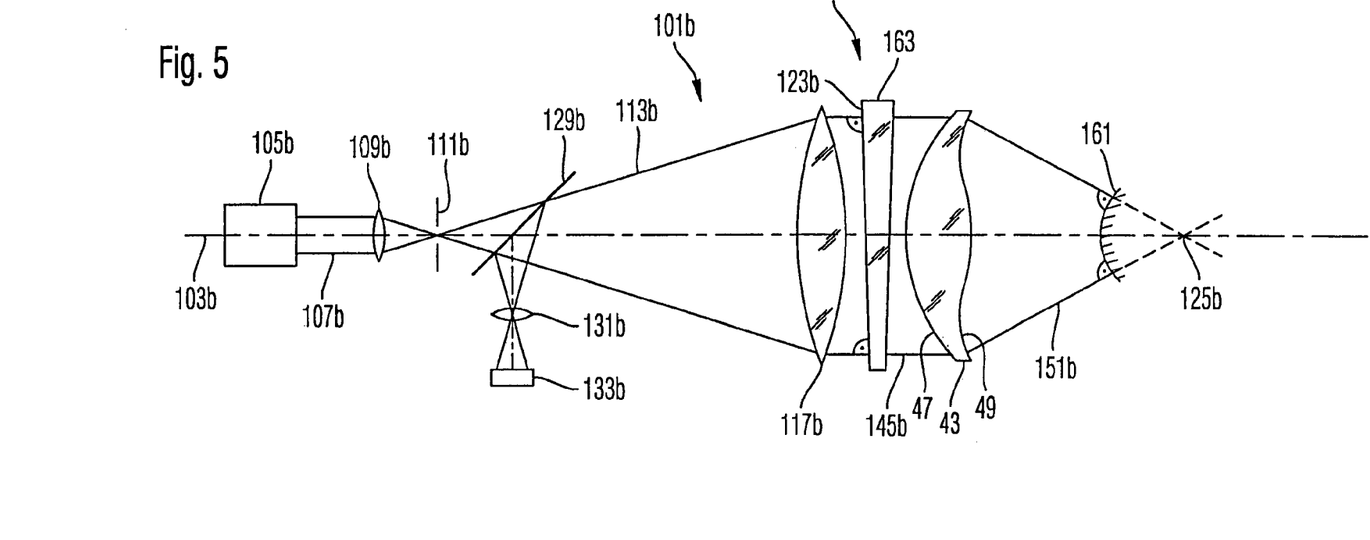
FIG. 5 is a sectional view of a further auxiliary interferometer apparatus for testing the aspherical lens used in the production interferometer of FIG. 2.

FIG. 5 shows a further example of an auxiliary interferometer apparatus 101b for testing aspherical lens 43 of interferometer optics 15a shown in FIG. 2. A beam source arrangement 105b,109b,111b of the apparatus produces a diverging beam of measuring light 113b having spherical wavefronts and which is transformed into a parallel beam 145b having substantially flat wavefronts by a collimating lens 117b. Parallel beam 145b corresponds to parallel beam 45 in FIG. 2, and is transformed by aspherical lens 43 into a converging beam 151b having spherical wavefronts and corresponding to beam 51 in FIG. 2. Converging beam 151b produces a crossover 125b on optical axis 103b. A spherical reference mirror 161 is positioned between aspherical lens 43 and crossover 125b in converging beam 151b such that wavefronts reflected back from reference mirror 161 are imaged onto a detector 133b. These wavefronts interfere on detector 133b with wavefronts reflected from a Fizeau surface 123b provided by a wedge shaped plate 163 positioned in parallel beam 145b.

From an analysis of the interference patterns detected by detector 133b it is possible to determine differences of aspherical surface 49 from its target shape.

Figure 6:
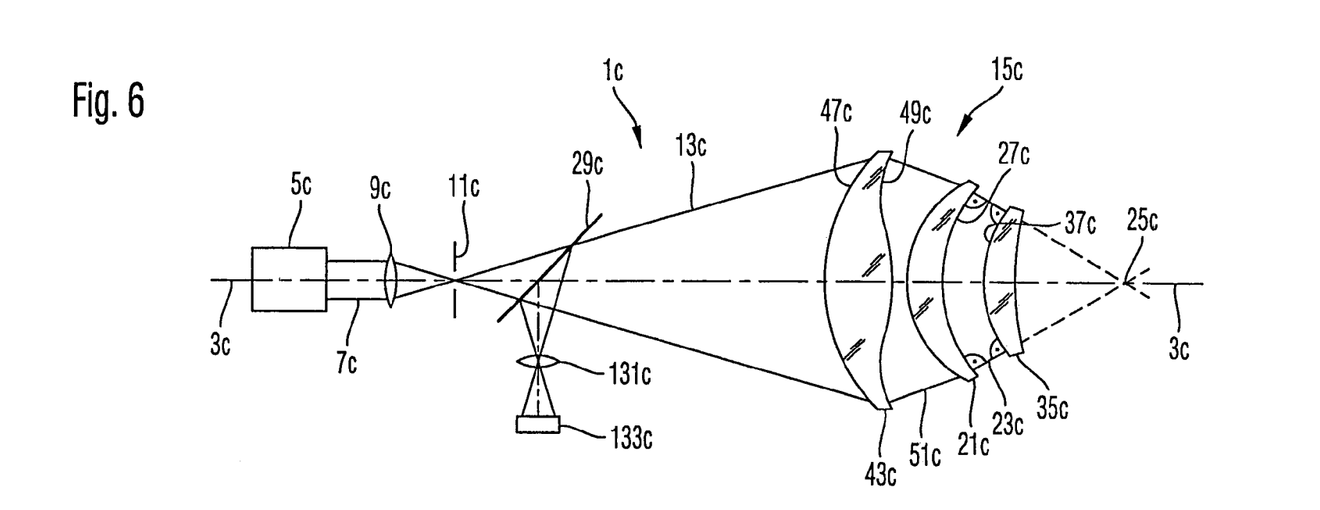
FIG. 6 is a sectional view of a further production interferometer apparatus for testing a spherical surface.

FIG. 6 shows a further exemplary embodiment of a production interferometer 1c for testing a spherical optical surface 37c of an optical element 35c. Interferometer 1c of FIG. 6 is similar to that shown in FIG. 2. However, an aspherical lens 43c of interferometer optics 15c of interferometer 1c shown in FIG. 6 is designed and configured such that a diverging beam 13c having spherical wavefronts supplied by a beam source arrangement 5c,9c,11c directly into a converging beam 51c having spherical wavefronts. An intermediate parallel beam (beam 45 in FIG. 2) is not formed by interferometer optics 15c shown in FIG. 6.

Figure 7:
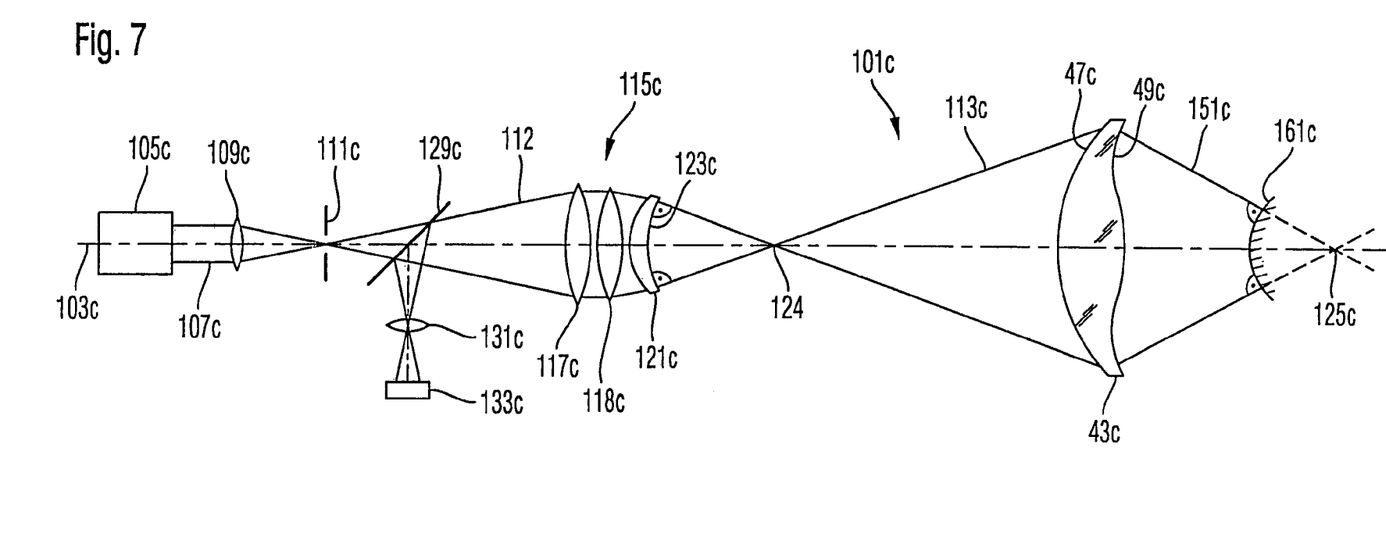
FIG. 7 is a sectional view of an auxiliary interferometer apparatus for testing an aspherical lens used in the production interferometer of FIG. 6.

An auxiliary interferometer 101c for testing aspherical lens 43c of the interferometer optics 15c shown in FIG. 6 is shown in FIG. 7. The auxiliary interferometer 101c comprises an interferometer optics 111c having lenses 117c, 118c, and 121c providing a Fizeau surface 123c of auxiliary interferometer 101c. Interferometer optics 115c transforms a diverging beam 112 having spherical wavefronts and provided by a beam source arrangement 105c,109c, 111c into a converging beam forming a crossover 124 and being a diverging beam 113c downstream of crossover 124. Diverging beam 113c has spherical wavefronts and corresponds in its opening angle to diverging beam 13c of FIG. 6. Aspherical lens 43c transforms diverging beam 113c into a converging beam 151c having spherical wavefronts and corresponding in its opening angle to beam 51c in FIG. 6. Converging beam 151c is reflected from a spherical reference mirror 161c arranged concentrically with respect to a crossover 125c of converging beam 151c. Wavefronts reflected from reference mirror, 161c form an interference pattern on a detector 133c together with wavefronts reflected back from Fizeau surface 123c. Aspherical lens 43c may be qualified by analyzing the interference fringes detected by detector 133c.

Figure 8:
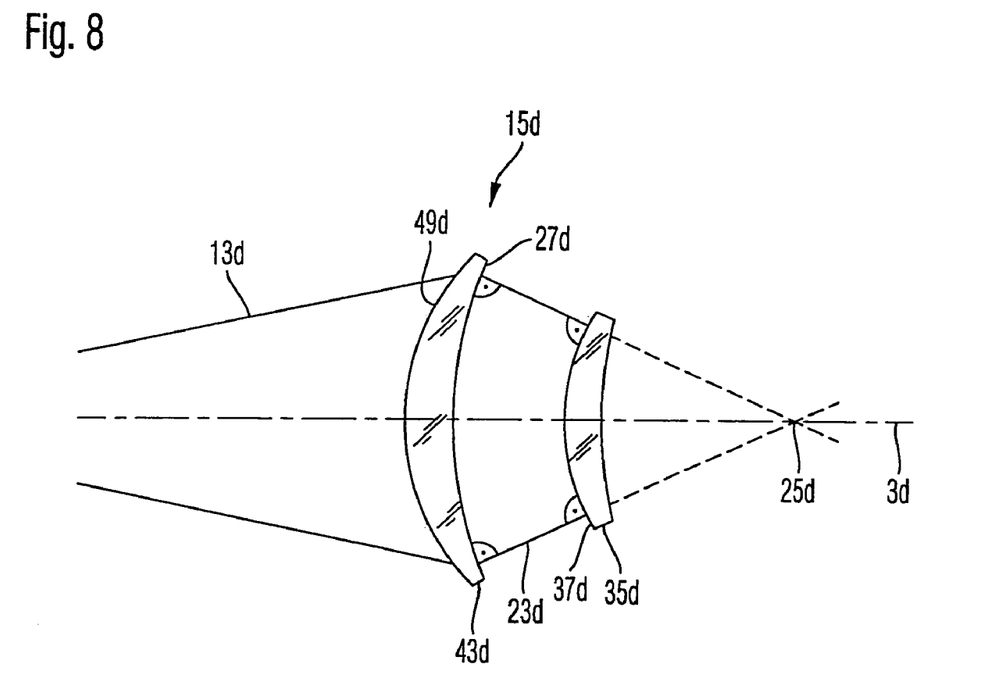
FIG. 8 shows a detail of an interferometric optics having an aspherical lens also providing a Fizeau surface.

FIG. 8 illustrates a further embodiment of the present invention. Similar to that shown in FIGS. 2 and 6 an interferometer optics 15d is provided for transforming a beam 13d of measuring light of a first spherical beam type, a diverging type, into a beam 23d of a second spherical beam type, a converging type. The interferometer optics 15d comprises one single aspherical lens 43d having one aspherical surface 49d and one spherical surface 27d. The interferometer optics 15d is configured for measuring a spherical surface 37d of a lens 35d. The spherical concave surface 27d of aspherical lens 43d further forms a Fizeau surface of the interferometer optics 15d.

For testing aspherical lens 43d this aspherical lens 43d may be mounted in an auxiliary interferometer similar to that shown in FIG. 7, wherein a separate reflecting mirror (mirror 161 in FIG. 7) may be omitted since the function for reflecting the beam of measuring light may be provided by Fizeau surface 27d of aspherical lens 43d.

In the embodiment shown in FIG. 8 the interferometer optics 15d comprises one single aspherical lens also providing the Fizeau surface of the interferometer optics. It is, however, also possible that the aspherical lens providing the Fizeau surface may be combined with further lenses to provide an interferometer optics comprising a plurality of lenses.

Figure 9:
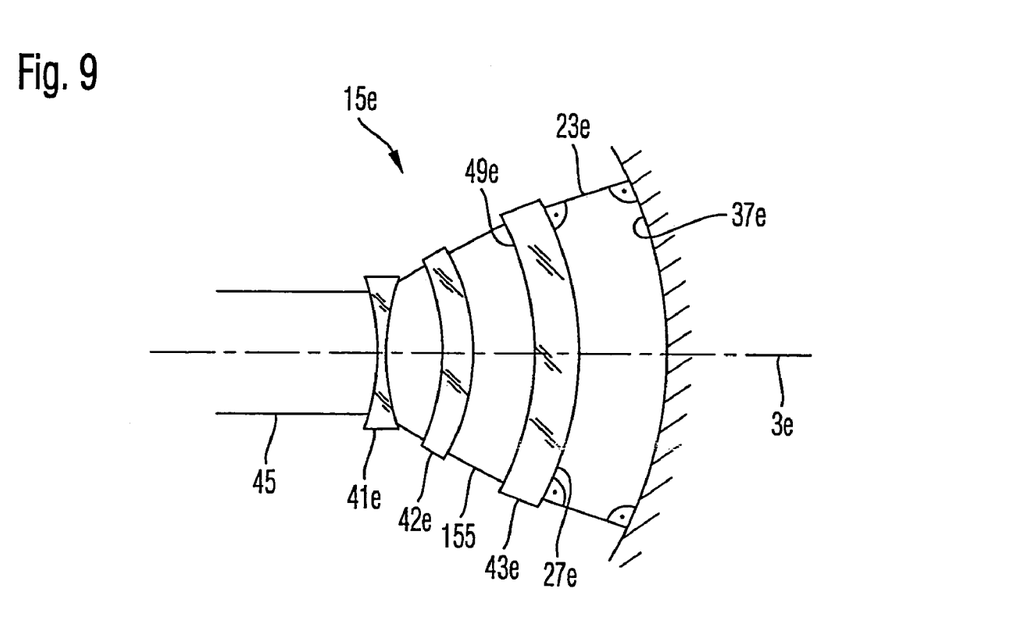
FIG. 9 shows a detail of an interferometric optics with aspherical lens providing a diverging beam of measuring light.

FIG. 9 illustrates a further exemplary embodiment including an interferometer optics 15e comprising plural lenses 41e,42e,43e, wherein lenses 41e and 42e transform a parallel beam 45 into a diverging spherical beam 155 which is transformed by an aspherical lens 43e into a diverging beam 23e for measuring a concave surface 37e. Aspherical lens 43e has a spherical surface 27e forming a Fizeau surface of interferometer optics.

Also aspherical surface 43e may be calibrated in an auxiliary interferometer similar to that shown in FIG. 7, wherein a separate mirror for reflecting measuring light may be omitted since this function may be provided by Fizeau surface 27e of aspherical lens 43e.

In the above illustrated embodiments the aspherical lens for transforming the beam of the first spherical beam type into the beam of the second spherical beam type is an optical member of the interferometer optics for supplying the beam of measuring light to the optical element to be tested. It is, however, possible to include such types of aspherical lenses in other components of the interferometer apparatus such as in collimators (such as 9a in FIG. 2 and 109 in FIG. 3) and camera optics (such as 31 in FIG. 2 and 131 in FIG. 3) and interferometer optics (such as 101 in FIG. 3). It is also possible that any of these functional groups of the interferomter apparatus includes two or more spherical of the above mentioned type than only one single aspherical lens as illustrated in the above embodiments.

In the above illustrated embodiments the interferometer arrangements are Fizeau-type interferometers. It is to be noted, however, that the invention is not limited to such type of interferometer. Any other type of interferometer, such as a Twyman-Green-type of interferometer, examples of which are illustrated in chapter 2.1 of the above mentioned text book of Daniel Malacara, a Michelson-type interferometer, examples of which are illustrated in chapter 2.1 of the above mentioned text book of Daniel Malacara, a Mach-Zehnder-type of interferometer, examples of which are illustrated in chapter 2.6 of the above mentioned text book of Daniel Malacara, a point-diffraction type interferometer, examples of which are illustrated in U.S. Pat. No. 5,548,403 and in the article "Extreme-ultraviolet phase-shifting point-diffraction interferometer: a wavefront metrology tool with subangstrom reference-wave accuracy" by Patrick P. Naulleau et al., Applied Optics-IP, Volume 38, Issue 35, pages 7252 to 7263, December 1999, and any other suitable type of interferometer may be used.

In the above, where maps of surface errors are determined by an interferometric measurement any method for interferogram evaluation may be used. Possible applicable methods are disclosed in chapter 12, of the book edited by Daniel Malacara, Optical Shop Testing, 2nd edition, Wiley interscience Publication (1992). Further, methods of phase shifting interferometry (PSI) may be applied, wherein a plurality of interferograms are analyzed for producing a surface map. Examples of phase shifting interferometry are presented in chapter 14 of the book mentioned above by Malacara. The phase shift is advantageously generated by varying the wavelength of the light providing the interferometric measuring beam using a wavelength tuneable light source.

It is further to be noted that the optical components involved in the above interferometric methods are subject to gravity during measurement. This may result in deformations of the surfaces of those components which are fixed in suitable mounts for arranging the components within the beam path of the interferometer. Even though the optical axis is oriented horizontally in FIGS. 1 to 3 and 5 to 7, it is also possible to perform the same measurements with an optical axis oriented vertically in the gravitational field. In any event, it is possible to use mathematical methods to simulate deformations of the optical components in the gravitational field. One such method is known as FEM (finite element method). All determinations of optical properties and deviations illustrated above may involve taking into account results of such mathematical methods for correcting and/or improving the determined results.

Summarized, the invention may provide a method of processing an optical element having a spherical surface comprising: providing a first interferometer apparatus having an interferometer optics comprising an aspherical lens for transforming a beam of a first spherical beam type into a beam of a second spherical beam type; arranging the optical element in a beam path of an incident beam provided by the interferometer optics interferometrically taking a first measurement of the optical element; and determining first deviations of the spherical surface; arranging the aspherical lens in a beam path of a measuring beam provided by a beam source of a second interferometer apparatus, wherein the measuring beam is one of the first spherical type and the second spherical type; interferometrically taking a second measurement using the measuring beam; and determining second deviations of an aspherical surface of the aspherical lens.

The present invention has been described by way of exemplary embodiments to which it is not limited. Variations and modifications will occur to those skilled in the art without departing from the scope of the present invention as recited in the appended claims and equivalents thereof.

What is claimed is:

1. A method of processing an optical element having a spherical surface, the method using light beams of a spherical beam type, the spherical beam type including beams having one of substantially spherical wave fronts and substantially plane wave fronts, the method comprising:

providing a first interferometer apparatus having an interferometer optics, wherein the interferometer optics comprises an aspherical lens configured to transform a beam of a first spherical beam type into a beam of a second spherical beam type, the aspherical lens having at least one aspherical surface;

arranging the optical element in a beam path of an incident beam of a third spherical type provided by the interferometer optics;

interferometrically taking a first measurement of first wave fronts generated by reflecting the incident beam from the spherical surface of the optical element; and determining first deviations of the spherical surface of the optical element from a target shape thereof in dependence on the first measurement;

wherein the method further comprises:

arranging the aspherical lens in a beam path of a measuring beam provided by a beam source of a second interferometer apparatus such that the measuring beam passes the aspherical lens and is reflected from a reflecting surface, wherein the measuring beam, between the aspherical surface and the reflecting surface, is one of the first spherical type and the second spherical type;

interferometrically taking a second measurement of second wave fronts generated by reflecting the measuring beam from the reflecting surface; and determining second deviations of the at least one aspherical surface of the aspherical lens from a target shape thereof in dependence on the second measurement.

2. The method according to claim 1, wherein the reflecting surface is provided on an optical element separate from the aspherical lens.

3. The method according to claim 1, wherein the reflecting surface is a surface of the aspherical lens opposite to the at least one aspherical surface thereof, for reflecting the measuring beam having passed the aspherical surface of the aspherical lens.

4. The method according to claim 1, wherein the interferometer optics comprises a Fizeau lens having a concave substantially spherical surface which is a Fizeau surface of the first interferometer apparatus.

5. The method according to claim 4, wherein the aspherical lens is the Fizeau lens, wherein the Fizeau surface is a surface of the aspherical lens opposite to the aspherical surface.

6. The method according to claim 1, further comprising: machining the aspherical surface of the aspherical lens in dependence on the second deviations.

7. The method according to claim 6, wherein the machining is only performed if the second deviations exceed a predetermined threshold.

8. The method according to claim 1, further comprising: applying an anti-reflective coating to the aspherical surface of the aspherical lens.

9. The method according to claim 1, further comprising: machining the spherical surface of the optical element in dependence on the first deviations.

10. The method according to claim 9, wherein the machining is only performed if the first deviations exceed a predetermined threshold.

11. The method according to claim 9, wherein the taking of the first measurement, the determining of the first deviations and the machining of the spherical surface are repeatedly performed.

12. The method according to claim 1, further comprising: finishing the spherical surface of the optical element.

13. The method according to claim 12, wherein the finishing comprises applying a coating to the spherical surface.

14. The method according to claim 13, wherein the coating comprises at least one of a reflective coating, an anti-reflective coating and a protective coating.

15. The method according to claim 1, wherein the spherical surface of the optical element has a k-value less than about 0.8.

16. The method according to claim 1, wherein the spherical surface of the optical element has a k-value less than about 0.7.

17. The method according to claim 1, wherein the spherical surface of the optical element has a k-value less than about 0.6.

18. The method according to claim 1, wherein the spherical surface of the optical element has a k-value less than about 0.55.

19. A method of processing an optical element having a spherical surface, the method using light beams of a spherical beam type, the spherical beam type including beams having one of substantially spherical wave fronts and substantially plane wave fronts, the method comprising:
providing a first interferometer apparatus having an interferometer optics, wherein the interferometer optics comprises an aspherical lens configured to transform a beam of a first spherical beam type into a beam of a second spherical beam type, the aspherical lens having at least one aspherical surface, the at least one aspherical surface having been interferometrically measured using a beam of one of the first spherical beam type and the second spherical beam type to determine that second deviations of the at least one aspherical surface from at least one corresponding target aspherical shape are less than a predetermined value;
arranging the optical element in a beam path of an incident beam of a third spherical type provided by the interferometer optics;
interferometrically taking a first measurement of first wave fronts generated by reflecting the incident beam from the spherical surface of the optical element; and
determining first deviations of the spherical surface of the optical element from a target shape thereof in dependence on the first measurement.

20. The method of claim 19, comprising machining the spherical surface.

21. The method of claim 19, comprising applying a coating to the spherical surface.

22. A method of processing an optical element having a spherical surface, the method using light beams of a spherical beam type, the spherical beam type including beams having one of substantially spherical wave fronts and substantially plane wave fronts, the method comprising:
positioning an optical element proximate a first interferometer apparatus having an interferometer optics, wherein the interferometer optics comprises an aspherical lens configured to transform a beam of a first spherical beam type into a beam of a second spherical beam type, the aspherical lens having at least one aspherical surface, wherein said positioning comprises arranging the optical element in a beam path of an incident beam of a third spherical type provided by the interferometer optics;
interferometrically taking a first measurement of first wave fronts generated by reflecting the incident beam from the spherical surface of the optical element; and
determining first deviations of the spherical surface of the optical element from a target shape thereof in dependence on the first measurement;
wherein the method further comprises:
arranging the aspherical lens in a beam path of a measuring beam provided by a beam source of a second interferometer apparatus such that the measuring beam passes the aspherical lens and is reflected from a reflecting surface, wherein the measuring beam, between the aspherical surface and the reflecting surface, is one of the first spherical type and the second spherical type;
interferometrically taking a second measurement of second wave fronts generated by reflecting the measuring beam from the reflecting surface; and
determining second deviations of the at least one aspherical surface of the aspherical lens from a target shape thereof in dependence on the second measurement.

23. The method of claim 22, comprising machining the spherical surface.

24. The method of claim 22, comprising applying a coating to the spherical surface.

* * * * *